(12) United States Patent
Narikawa et al.

(10) Patent No.: US 12,140,782 B2
(45) Date of Patent: Nov. 12, 2024

(54) PROJECTION PROCESSOR, SPATIAL PROJECTION APPARATUS, SPATIAL PROJECTION SYSTEM, AND SPATIAL PROJECTION METHOD

(71) Applicant: CASIO COMPUTER CO., LTD., Tokyo (JP)

(72) Inventors: Tetsuro Narikawa, Hamura (JP); Kazuyasu Fukano, Hachioji (JP); Masaki Kobayashi, Higashiyamato (JP); Shunsuke Hara, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 439 days.

(21) Appl. No.: 17/691,634

(22) Filed: Mar. 10, 2022

(65) Prior Publication Data

US 2022/0291522 A1 Sep. 15, 2022

(30) Foreign Application Priority Data

Mar. 11, 2021 (JP) ................. 2021-038823

(51) Int. Cl.
*G02B 30/56* (2020.01)
*G02B 30/35* (2020.01)
*G02B 30/40* (2020.01)

(52) U.S. Cl.
CPC ............. *G02B 30/56* (2020.01); *G02B 30/35* (2020.01); *G02B 30/40* (2020.01)

(58) Field of Classification Search
CPC ........ G02B 30/56; G02B 30/35; G02B 30/40; G02B 5/12; H04N 9/31; H04N 9/3147; G03B 21/14
See application file for complete search history.

(56) References Cited

U.S. PATENT DOCUMENTS

| 2014/0146290 | A1* | 5/2014 | Sieler | ................... G03B 21/147 353/30 |
| 2015/0062446 | A1* | 3/2015 | Schreiber | ........... G01B 11/2513 353/31 |
| 2019/0271943 | A1* | 9/2019 | Bezirganyan | ........ H04N 13/302 |
| 2020/0301166 | A1* | 9/2020 | Dehkordi | ............... G02B 30/25 |

FOREIGN PATENT DOCUMENTS

| JP | 2006-317708 A | 11/2006 |
| JP | 2019169916 A | 10/2019 |
| WO | 2020021868 A1 | 1/2020 |

OTHER PUBLICATIONS

First Office Action dated Mar. 28, 2024 received in Chinese Patent Application No. CN 202210235702.2.

* cited by examiner

*Primary Examiner* — Magda Cruz (74) *Attorney, Agent, or Firm* — Scully, Scott, Murphy & Presser, P.C.

(57) ABSTRACT

A projection processor includes a processing unit, and the processing unit obtains information concerning a first projected image which is projected by a projector to be formed on an image forming medium and corrects information concerning a second projected image which is formed on the image forming medium as projected light, which is to be refocused on an aerial space image forming section by a light guide optical system, based on the information concerning the first projected image obtained.

17 Claims, 8 Drawing Sheets

PROJECTION PROCESSOR, SPATIAL PROJECTION APPARATUS, SPATIAL PROJECTION SYSTEM, AND SPATIAL PROJECTION METHOD

CROSS-REFERENCE TO RELATED APPLICATION

This patent application is based upon the benefit of priority under 35 USC 119 from Japanese Patent Application No. 2021-038823 filed on Mar. 11, 2021, the entire disclosure of which, including the specification, claims, drawings and abstract, is incorporated herein by reference.

BACKGROUND OF THE INVENTION

Field of the Invention

The present invention relates to a projection processor, a spatial projection apparatus, a spatial projection system, and a spatial projection method.

Description of the Related Art

There have conventionally been disclosed spatial projection techniques for projecting an image in an aerial space by causing projected light to be focused in the aerial space. For example, Japanese Patent Laid-Open No. 2006-317708 (JP-A-2006-317708) discloses a mid-air floating image projection device for projecting an image in an aerial space using a configuration including a lower compartment where a projection target, which is a display image or a real thing, is disposed, a first Fresnel lens, a beam splitter, a surface reflector, and a second Fresnel lens.

SUMMARY OF THE INVENTION

A projection processor according to an embodiment of the present invention includes a processing unit. The processing unit obtains information concerning a first projected image which is projected by a projector to be formed on an image forming medium and corrects information concerning a second projected image which is formed on the image forming medium as projected light, which is to be refocused on an aerial space image forming section by a light guide optical system, based on the information concerning the first projected image obtained.

A spatial projection apparatus according to the embodiment of the present invention includes a projector having a processing unit. The processing unit obtains information concerning a first projected image which is projected by the projector to be formed on an image forming medium and corrects information concerning a second projected image which is formed on the image forming medium as projected light, which is to be refocused on an aerial space image forming section by a light guide optical system, based on the information concerning the first projected image obtained.

A spatial projection system according to the embodiment of the present invention includes a projector having a processing unit. The processing unit obtains information concerning a first projected image which is projected by the projector to be formed on an image forming medium and corrects information concerning a second projected image which is formed on the image forming medium as projected light, which is to be refocused on an aerial space image forming section by a light guide optical system, based on the information concerning the first projected image obtained.

A spatial projection method according to the embodiment of the present invention includes obtaining information concerning a first projected image which is projected by a projector having a processing unit to be formed on an image forming medium, correcting information concerning a second projected image which is formed on the image forming medium as projected light, which is to be refocused on an aerial space image forming section by a light guide optical system, based on the information concerning the first projected image obtained, and causing the projector to project the second projected image.

DESCRIPTION OF THE EMBODIMENTS

Embodiment 1

Figure 1:
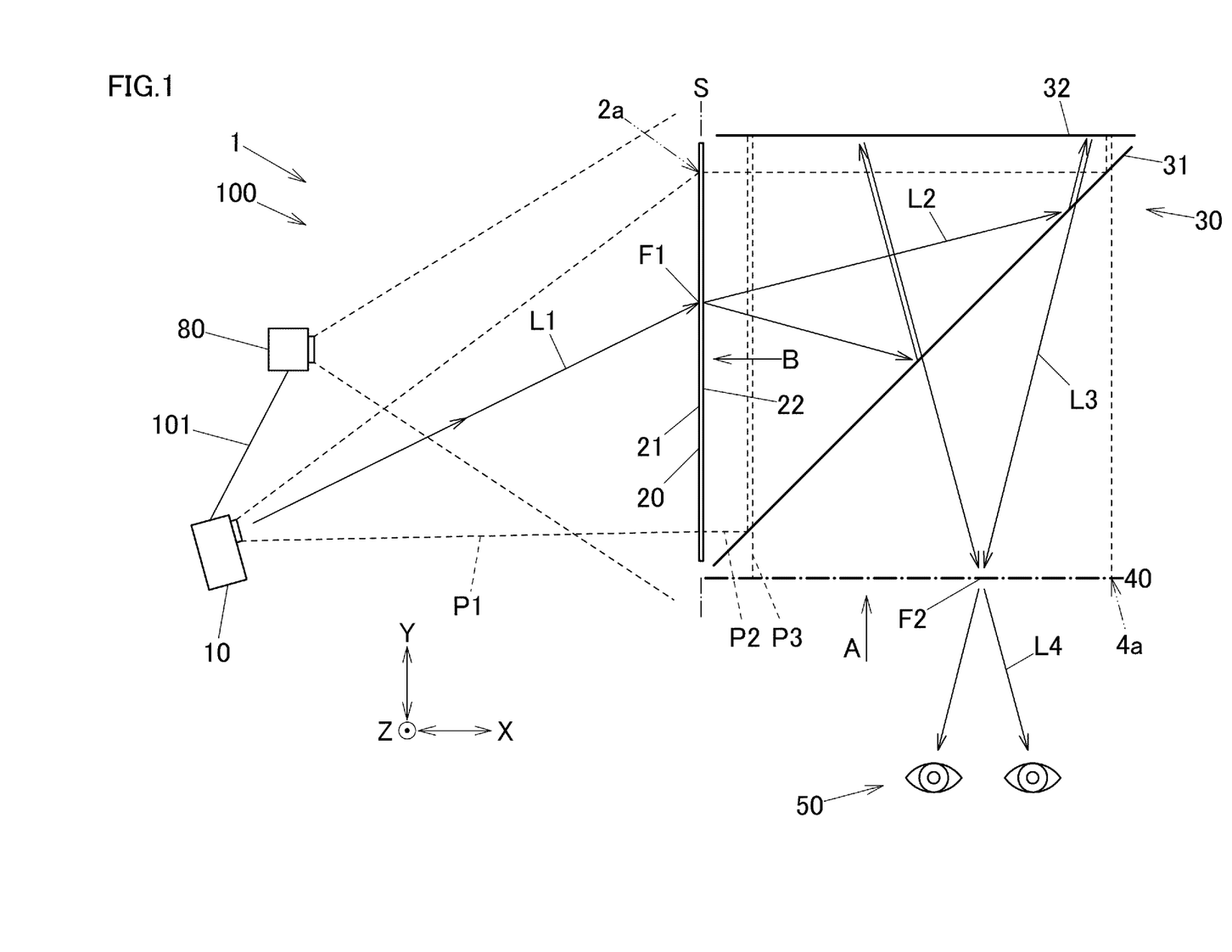
FIG. 1 is a schematic plan view of a spatial projection apparatus according to Embodiment 1 of the present invention.

Hereinafter, a mode for carrying out the present invention will be described. FIG. 1 is a schematic plan view of a spatial projection apparatus 100 of a spatial projection system 1. The spatial projection apparatus 100 includes a projector 10 (a projection controller), an image forming medium 20 onto which projected light P1 emitted from the projector 10 is shined, a light guide optical system 30 configured to guide light projected on the image forming medium 20, an aerial space image forming section 40 on which light guided by the light guide optical system 30 is refocused, and an imaging device 80 for imaging a projected image 2a projected on the image forming medium 20. In the spatial projection apparatus 100, a projected image 2a, which is formed on the image forming medium 20 by light emitted from the projector 10, is diffuse transmitted through the image forming medium 20 and is then incident on the light guide optical system 30. Then, the projected image 2a is refocused to be reimaged on the aerial space image forming section 40 by the light guide optical system 30, whereby a spatial projected image 4a, which appears floating in a mid-air or aerial space, can be visualized by a viewer 50.

There may be a case in which the projected image 2a projected by the projector 10 is visualized as being different from an original image data (a projected image 112 shown in FIG. 2) or as a shape which is not intended from a view point of a viewer 50 due to an influence of a shape or the like of a projection surface (a first surface) of the image forming medium 20 or as a result of the projected light P1 (and spatial projected lights P2, P3) being projected obliquely onto the image forming medium 20 which constitutes a projection target plane. Then, in the present embodiment, a processing unit 12 corrects the projected image 112 so that a spatial projected image 4a can preferably be visualized from the view point of the viewer 50. The correction is executed in such a way that pieces of image correction information 111, 841 (refer to FIG. 2) are obtained based on a deviation between a correction image 70 projected by the projector 10 and a captured image 60 captured by the imaging device 80. As a result, the projector 10 can project an image based on the image correction information 111 so obtained so that a projected image 112 of the image so projected can be visualized in an intended form by the viewer 50.

Figure 2:
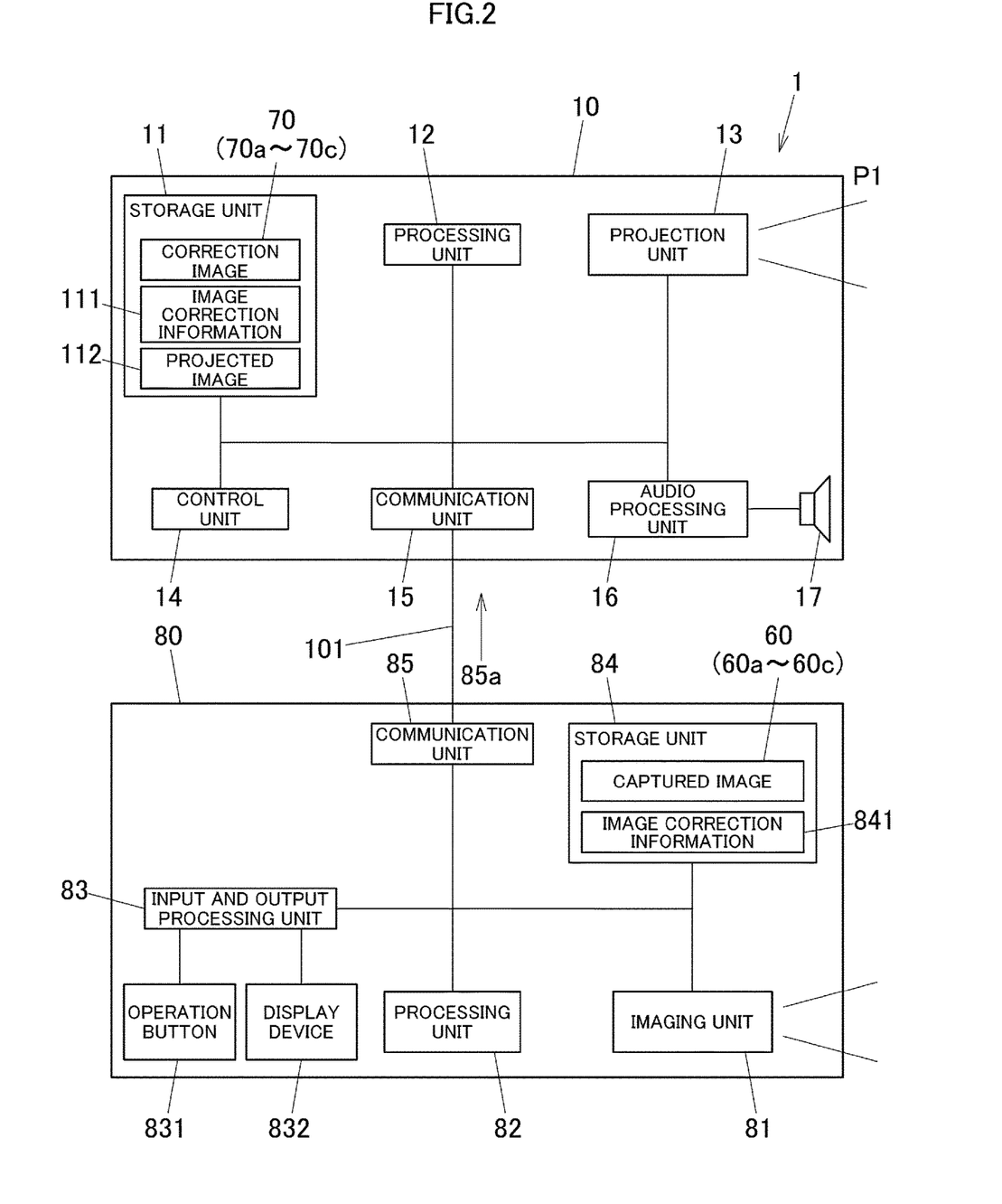
FIG. 2 is a block diagram showing configurations of a projector and an imaging device according to Embodiment 1 of the present invention.

Referring to FIG. 2, configurations of the projector 10 and the imaging device 80 will be described. The projector 10 includes a storage unit 11, a processing unit 12, a projection unit 13, a control unit 14, a communication unit 15 (an acquisition unit), and an audio processing unit 16, and these constituent elements are connected to one another via internal buses. The storage unit 11 is made up of a solid state driver (SSD) and a static random access memory (SRAM). The storage unit 11 stores the correction image 70 (70a to 70c), the image correction information 111, a projected image 112, which is an image for forming a solid image (for enjoyment), (including image data or video image data), and data such as a control program or the like. The processing unit 12 is made up of CPU, a microprocessor, or the like and reads out the control program stored in the storage unit 11 so as to control the projector 10.

The projection unit 13 forms an image at a frame rate which comply with a preset image format based on a projected image 112 sent from the processing unit 12 and emits the image so formed as projected light P1 to the outside of the projector 10. The projector 10 of the present embodiment is a projector of a digital light processing (DLP) type. In the projection unit 13, light in the blue wavelength range, light in the green wavelength range, and light in the red wavelength range are emitted from an internal light source apparatus and are then shined onto a digital micromirror device (DMD). Then, micromirror lenses (or pixels) of this DMD reflect individually the light in the blue wavelength range, the light in the green wavelength range, and the light in the red wavelength range in a time sharing fashion, whereby color image light can be produced. The image light is emitted as projected light P1 of the projector 10 to the outside thereof via a projection lens inside the projection unit 13. The projected light P1 (image light) emitted from the projection unit 13 is projected onto the image forming medium 20 shown in FIG. 1.

The control unit 14 receives a control signal from a control key or the like which is provided on a casing of the projector 10 and transmits the control signal so received to the processing unit 12 via the buses. The processing unit 12 executes various functions such as an imaging operation or the like in accordance with a control signal received from the control unit 14.

The communication unit 15 receives wirelessly a control signal in the form of an infrared modulation signal or the like which is transmitted thereto from a remote controller, not shown, and then transmits the control signal so received to the processing unit 12. In addition, the communication unit 15 is connected with a communication unit 85 of the imaging unit 81 by way of a wired cable 101 so as to transmit and receive data to and from the communication unit 85. The communication unit 15 may include an external input terminal, so that image data can be inputted in the communication unit 15 therethrough from an external device.

The audio processing unit 16 includes a circuitry for a sound source such as a pulse code modulation (PCM) sound source or the like and drives a speaker 17 to diffuse and emit sound or voice loudly therefrom. In the case that an audio signal is included in image data which is projected, the audio processing unit 16 converts the audio signal into an analog signal when projecting the image data so as to output voice or sound loudly through the speaker 17.

The imaging device 80 includes an imaging unit 81, a processing unit 82, an input and output processing unit 83, a storage unit 84, and a communication unit 85, which are connected by internal buses. The imaging unit 81 images a projected image 2a which is projected onto the image forming medium 20 shown in FIG. 1.

The processing unit 82 has a function to control the imaging device 80 and is made up of CPU, a microcomputer, or the like. The processing unit 82 analyzes a captured image 60 including the correction image 70 imaged or captured by the imaging unit 81. The processing unit 82 transmits the results of the analysis of the correction image 70 to the projector 10 as image correction information 841 by way of the communication unit 85. In addition, the processing unit 82 transmits a projection instruction 85a to the projector 10 by way of the communication unit 85 depending upon the results of the analysis of the captured image 60.

The input and output processing unit 83 transmits information corresponding to an operating instruction which is inputted from an operation button 831 by the viewer 50 or the like to the processing unit 82. A display device 832 is a screen on which an image outputted from the input and output processing unit 83 is displayed, an indicator lamp, or the like. The storage unit 84 stores a control program for the imaging device 80, the captured image 60 imaged or captured by the imaging unit 81, the image correction information 841, and the like.

Returning to FIG. 1, the image forming medium 20 has an arbitrary shape and size which can substantially encompass a projection range of the projected light P1. Alternatively, the image forming medium 20 is disposed in an arbitrary position which includes the projection range of the projected light P1. The image forming medium 20A (20) in FIG. 1 is configured as a light transmitting plate-like film or film. The image forming medium 20 is a light transmitting member in which when the projected light P1 (including light L1) emitted from the projector 10 is shined on a first surface 21, which faces the projector 10, of the image forming medium 20, spatial image forming light P2 (also including light L2) is diffuse emitted from a second surface 22, which is opposite to the first surface 21, towards the light guide optical system 30.

The light guide optical system 30 is provided on a side of the image forming medium 20 on which the second surface 22 is provided and includes a beam splitter 31 and a retro-reflection member 32 (a retro-reflection mirror). The retro-reflection member 32 is disposed so as to be at right angles to a disposition plane S (a plane including the Y-direction (the front-rear direction) and the Z-direction (an up-down direction) in FIG. 1) of the image forming medium 20. The beam splitter 31 is formed into a flat plate-like shape and is disposed so as to be inclined at an angle of 45 degrees with respect to the disposition plane S of the image forming medium 20 and the retro-reflection member 32. The beam splitter 31 of the present embodiment is a half mirror configured to reflect a part of light incident thereon and to transmit therethrough a part of the remainder of the light. The retro-reflection member 32 has a mirror surface which reflects light incident thereon in an opposite direction which is opposite to an incident direction.

The aerial space image forming section 40 constitutes a mid-air or aerial area on which a spatial projected image 4a is displayed as a result of the projected image 2a projected onto the image forming medium 20 being emitted therefrom as spatial projected light P2 (P3) and the spatial projected light P2 (P3) being thereafter refocused on the aerial area.

Next, a spatial projection method for the spatial projection apparatus 100 (the spatial projection system 1) will be described. The projector 10 shines light onto the image forming medium 20 from an oblique direction which is inclined relative to a light axis of the whole projected light P1 and a normal direction (the X-direction) of the image forming medium 20. Light L1 emitted from a point light source (an arbitrary point on a micromirror of DMD, that is, the display device) inside the projector 10 (inside the projection unit 13) via the projection lens is focused at an image forming point F1 on the image forming medium 20. Light, which is emitted from point light sources inside the projector 10 and is focused, is shined along an optical path illustrated by the light L1 over a shining range of the projected light P1. As a result, the projected image 2a is projected on the image forming medium 20.

The light at the arbitrary point, which makes up the projected image 2a formed on the image forming medium 20, is diffuse transmitted through the image forming medium 20 at a predetermined diffuse angle and is then emitted from the second surface 22. For example, the light L1, which is focused at the image forming point F1, is diffused at the predetermined diffuse angle and is then incident on the beam splitter 31 as light L2. A part of the light L2 is reflected towards the retro-reflection member 32 by the beam splitter 31. That is, the light L2, which is emitted from the point light source of the projected image 2a, is guided as diffuse light along an optical path from the image forming medium 20 to the retro-reflection member 32. Since the retro-reflection member 32 reflects light incident thereon in an opposite direction opposite to the incident direction, the light L2 incident on the retro-reflection member 32 is reflected towards the beam splitter 31 as converging light which converges at an angle which is the same as the diffuse angle. Light L3 reflected on the retro-reflection member 32 is partially transmitted through the beam splitter 31 and is guided towards the aerial space image forming section 40. Then, the light L3 is refocused at an image forming point F2 on the aerial space image forming section 40. An optical path length of the light L2 is substantially the same as an optical path length of the light L3.

Then, the light L3, which is focused at the image forming point F2 on the aerial space image forming section 40, is guided as light L4 having a diffuse angle which is the same as a converging angle of the light L3 and the diffuse angle of the light L2.

The lights L1 to L4, which are originated from the point light source of the display device within the projector 10 described above, are guided over within the effective area of the optical paths of the image forming medium 20 and the light guide optical system 30. That is, projected light P1, which is a set of lights L1 emitted from point light sources of the projector 10, is shined onto the first surface 21 of the image forming medium 20 and is focused on the image forming medium 20 to thereby form an image thereon. The projected light P1, which is shined onto the image forming medium 20, is them emitted from the second surface 22 towards the beam splitter 31 as spatial projected light P2, which is a set of lights L2. A part of the spatial projected light P2 which is shined onto the beam splitter 31 is reflected towards the retro-reflection member 32. The retro-reflection member 32 reflects the spatial projected light P2 which is guided from the beam splitter 31 as spatial projected light P3 (a set of lights L3). A part of the spatial projected light P3, which is reflected by the retro-reflection member 32, passes through the beam splitter 31 and is then guided towards the aerial space image forming section 40.

In this way, the lights (the set of pint light sources) making up the projected image 2a formed on the image forming medium 20 are refocused on the aerial space image forming section 40, which constitutes a spatial or aerial space projection plane, and are then emitted towards the viewer 50. As a result, the viewer 50 can visualize the spatial projected image 4a which is imaged in an aerial space. In addition, the viewer 50 can visualize the spatial projected image 4a even when an observing point is changed. For example, the light L4 emitted from the image forming point F2 can be visualized in a position located within a diffuse angle range (within an emerging angle range) of the light L4 shown in FIG. 1.

Orientations in the up-down direction (the Z-direction) and the left-right direction (the X-direction) of the spatial projected image 4a as viewed from a direction A, which is a direction from the viewer 50 towards the aerial space image forming section 40, are substantially the same as orientations in the up-down direction (the Z-direction) and the front-rear direction (the Y-direction) of the projected image 2a as viewed from a direction B. On the other hand, since the optical path lengths of the light L2 and the light L3 are substantially the same, a depth position of the spatial projected image 4a as viewed from the direction A is in an opposite relationship with a depth position of the projected image 2a as viewed from the direction B (this will be described later by reference to FIG. 3). In the case that the image forming medium 20, which is provided as a flat plane in FIG. 1, is used, the spatial projected image 4a is also displayed as a flat image in a plan view.

Next, referring to FIG. 3, a configuration will be described in which the image forming medium 20A having the arc-like surface is used in place of the image forming medium 20 shown in FIG. 1. A degree of irregularity of the image forming medium 20A is configured so as to fall within a depth of field of the projected light P1 (the light L1) emitted from the projector 10. As a result, the focused projected image 2a (or the projected image 2a which appears to be focused) is displayed on the image forming medium 20A.

As has been described before, the optical path lengths of the light L2 and the light L3 which are guided by the light guide optical system 30 are substantially the same, and the depth position of the spatial projected image 4a as viewed from the direction A and the depth position of the projected image 2a as viewed from the direction B are in the opposite relationship. That is, as shown in FIG. 3, the image forming point F1 positioned on a far side of the curved projected image 2a as viewed from the direction B corresponds to the image forming point F2 positioned on a near side of the spatial projected image 4a as viewed from the direction A.

As a result, the spatial projected image 4a, which is three-dimensional, can be projected on the aerial space image forming section 40 by forming the image forming medium 20A into a three-dimensional planar shape having the irregularity.

Figure 4:
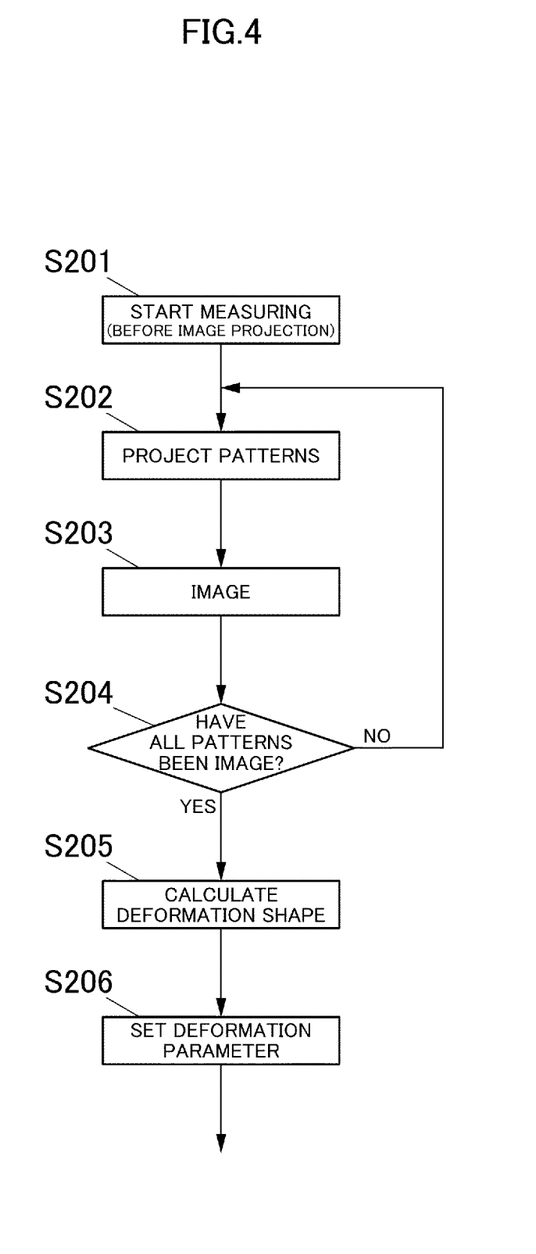
FIG. 4 is a flow chart showing operations performed by the spatial projection apparatus according to Embodiment 1 of the present invention.

Next, referring to FIGS. 4 and 5, a processing method for correcting a projected image will be described. The spatial projection apparatus 100 images the projected image 2a projected on the image forming medium 20 and obtains image correction information 111 (a deformation parameter) for use for correction of the projected image 112 based on a captured image 60 so obtained. FIG. 4 shows a processing example of calculating image correction information 111 in advance before a projected image 112 for forming a solid image (for enjoyment) is projected. When starting to measure image correction information 111 (step S201), the processing unit 12 of the projector 10 executes a pattern projection of the correction image 70 on the image forming medium 20 in step S202.

Figure 5A:
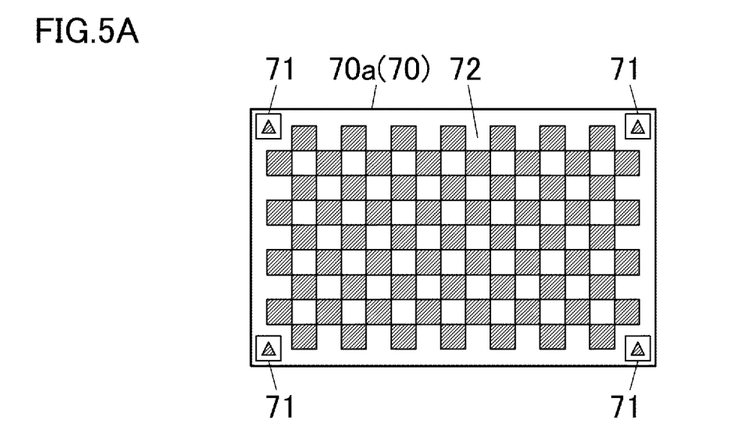
FIGS. 5A to 5C are diagrams showing individually correction images according to Embodiment 1 of the present invention, the correction images specifically showing those for correcting a strain in an imaging medium.
Figure 5B:
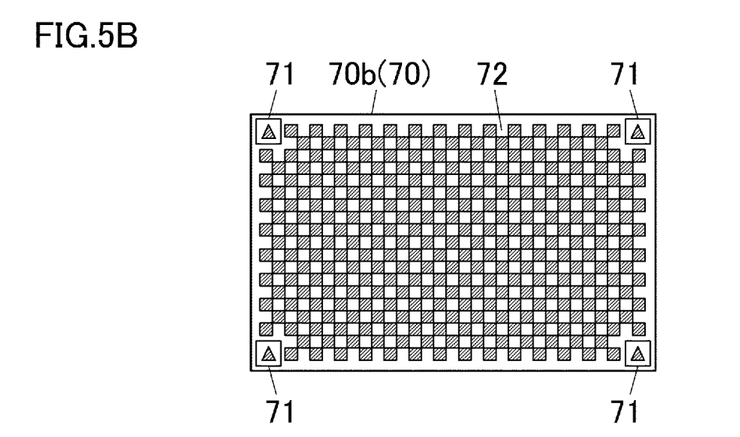
Figure 5C:
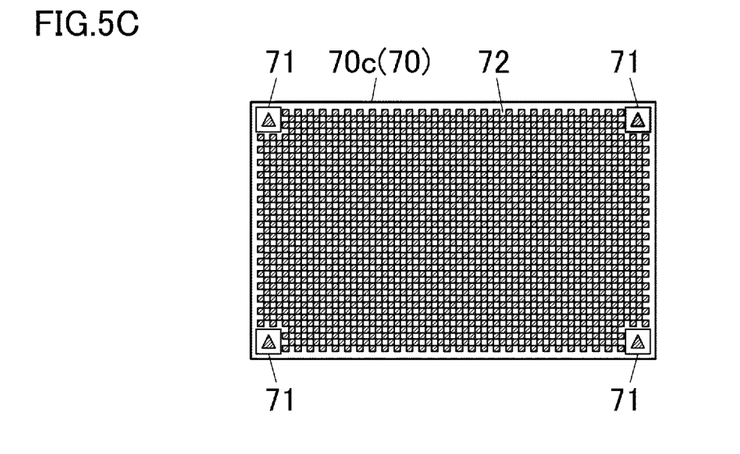

FIGS. 5A, 5B, and 5C show correction images 70a to 70c, respectively, which are used to correct a strain in a projected image 2a which is projected onto the image forming medium 20. The correction image 70a, the correction image 70b, and the correction image 70c each have a measurement image 72 over a substantially whole surface of which a checkered pattern is disposed in which white and black quadrangles, which are substantially square, are alternately disposed in a vertical direction and a horizontal direction. The correction images 70a to 70c can detect a strain in the first surface 21 with different resolving powers which differ in size of the checkered pattern. The projector 10 projects the correction images 70a to 70c onto the first surface 21 and causes an imaging device, not shown, to image the first surface 21. The imaging device can detect a strain in the whole of the first surface 21 by combining the multiple correction images 70a to 70c. The imaging device may be separate from the projector 10 or may be provided in the projector 10.

In the present embodiment, the projector 10 projects the correction image 70a having a large checkered pattern, the correction image 70b having a intermediate checkered pattern, and the correction image 70c having a small checkered pattern sequentially in this order onto the image forming medium 20. As this occurs, corner portions of the quadrangles of the individual correction images 70a, 70b, 70c having the checkered patterns which differ in size are disposed so as not to overlap each other at the time of projection.

In step S203, the processing unit 82 of the imaging device 80 images the correction images 70 (70a to 70c) so projected from a side of the image forming medium 20 which faces the projector 10 using the imaging unit 81 to obtain them. The imaging device 80 of the present embodiment is provided outside the projector 10 as a separate device.

In step S204, the processing unit 12 determines whether the patterns of all the correction images 70a to 70c have been projected and have been imaged by the imaging device 80. Here, the processing unit 12 can execute the determination in step S204 by receiving a notification that the imaging device 80 has obtained captured images 60 for all the correction images 70 by way of the communication units 85, 15. If the processing unit 12 determines that the patterns of all the correction images 70a to 70c have been projected and imaged (YES in S204), the processing unit 12 proceeds to an operation in step S205. On the contrary, if the processing unit 12 determines that the patterns of all the correction images 70 have not yet been projected and imaged (NO in S204), the processing step 12 returns to the operation in step S202. In the present embodiment, the projector 10 sequentially projects the correction images 70a to 70c until the projection and imaging of the three correction images 70a to 70c have been executed.

In step S205, the processing unit 82 of the imaging device 80 identifies respective positions of the correction images 70a to 70c from positions of markers 71 detected from the captured images 60a to 60c (which are captured images of the correction images 70a to 70c, respectively). Specifically speaking, in the present embodiment, since the markers 71 are disposed in the same positions in four corners of each of the correction images 70a to 70c shown in FIGS. 5A to 5C, respectively, the imaging device detects positional deviations in parallel components and rotational components of the correction images 70a to 70c by detecting positional deviations of the markers 71 among the correction images 70a to 70c. The processing unit 82 detects multiple positional deviations of the correction images 70a to 70c for execution of an offset correction. This can correct a positional deviation between captured images 60a to 60c which would be caused by a camera shake or the like. The processing unit 82 detects coordinates of an intersection point (a corner portion) of the checkered patterns of the correction images 70a to 70c in the captured images 60a to 60c so as to obtain a degree of strain in the image forming medium 20. The imaging device 80 generates image correction information 841 from the information on the degree of strain.

Then, in step S206, the processing unit 82 causes the projector 10 to obtain the image correction information 841 so obtained via the communication units 15, 85. The processing unit 12 of the projector 10 can causes the storage unit 11 to store the image correction information 841 so obtained as image correction information 111 and execute an image correction operation on the projected image 112 for forming a solid image (for enjoyment) (the image data of the contents) based on the image correction information 111. That is, the processing unit 12 functions as a correction unit. Thereafter, the processing unit 12 causes the projected image 112, which is now corrected for strain based on the image correction information 111, to be emitted from the projection unit 13 as projected light P1. In this way, the projector 10 can project the projected image 2a (the corrected projected image 112 (a second projected image)) which is corrected based on the information concerning the captured image 60 of the formed projected image 2a (the correction image 70, which is a first projected image) (for example, the image correction information 841 including the difference information (a degree of strain) between the coordinates on the display device and the coordinates on the captured image 60) by the projected light P1. As a result, the projector 10 can project an intended spatial projected image 4a in an aerial space so as to be visualized by the viewer 50.

Thus, as has been described heretofore, in the spatial projection apparatus 100 of the present embodiment, the projection target which is projected as the spatial projected image 4a is formed by the projected image 2a. As a result, the projected image 2a can be displayed whose luminance is higher than in a case in which a display image or a real thing is used as a projection target, whereby the spatial projected image 4a can also be displayed highly brightly. In addition, the projected image 2a projected by the projector 10 can be enlarged in size by enlarging the shape of the image forming medium 20, 20A and providing an appropriate spacing distance between the projector 10 and the image forming medium 20, 20A, whereby the spatial projected image 4a can easily be enlarged in size. As a result, with the spatial projection apparatus 100, a large spatial projected image 4a can be projected without changing the overall configuration thereof largely. Further, even in the case that the projected light P1 is shined obliquely onto the image forming medium 20 or in the case that the image forming medium 20 is formed on an arbitrary three-dimensional surface, the intended spatial projected image 4a as viewed by the viewer 50 can be displayed in the aerial space by correcting the strain in the projected image 2a formed on the image forming medium 20. In this way, the space projection can be enabled which provides a high visual sense effect with the simple configuration by employing the spatial projection method using the spatial projection apparatus 100 (the spatial projection system 1).

Embodiment 2

Figure 6:
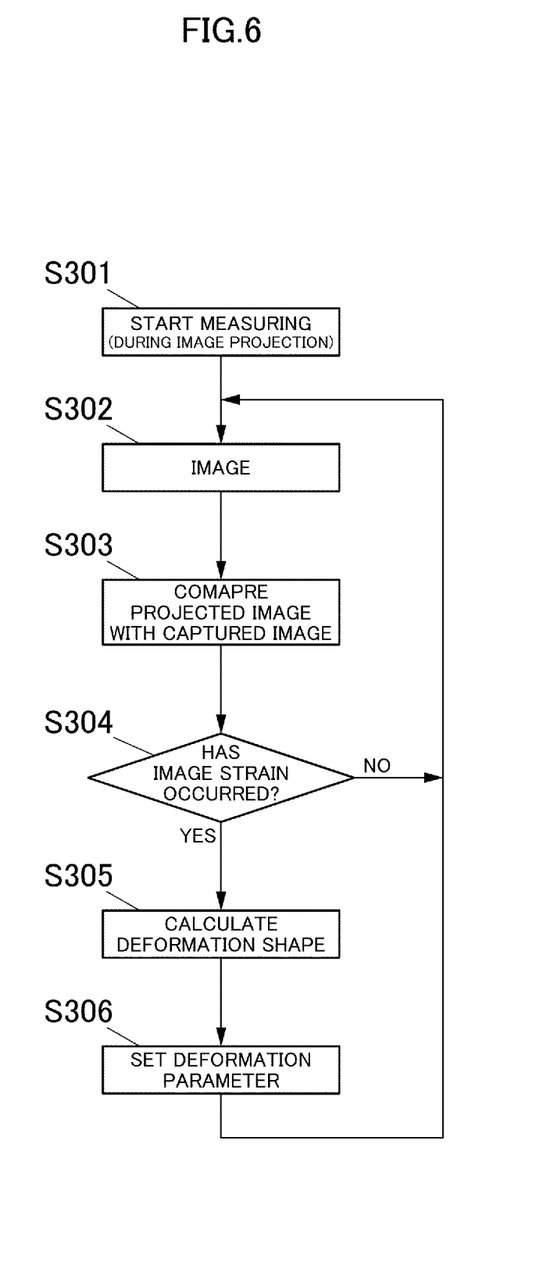
FIG. 6 is a flow chart showing operations performed by a spatial projection apparatus according to Embodiment 2 of the present invention.

Next, Embodiment 2 will be described. FIG. 6 shows an operation example in which the spatial projection apparatus 100 in the spatial projection system 1 of Embodiment 1 calculates image correction information 111 (a deformation parameter) during a projecting operation of a projected image 112. Here, similar configurations of a spatial projection apparatus 100 of Embodiment 2 to those of the spatial projection apparatus 100 of Embodiment 1 will be briefly described, or the description thereof will be omitted.

In step S301, a processing unit 12 is projecting an arbitrary projected image 112 onto an image forming medium 20 while superposing thereon a correction image (not shown) which enables a detection of coordinates while the processing unit 12 is projecting the projected image 112 so that the correction image is included in the projected image 112. For example, in an image contained in the contents, a location where a strain detection (a position detection) can easily be executed through a binarization operation can be used as the correction image which is included in the projected image 112.

In step S302, a processing unit 82 of an imaging device 80 images the projected image 112 including the correction image from a side of the image forming medium 20 which faces a projector 10 using an imaging unit 81 to thereby obtain a captured image 60. The processing unit 82 causes the projector 10 to obtain the captured image 60 via a communication unit 85 and a communication unit 15. In step S303, the processing unit 12 of the projector 10 compares the projected image 112 containing the correction image with the captured image 60 obtained from the imaging device 80.

In step S304, the processing unit 12 determines whether a change in image strain has occurred (image correction information 111 needs to be changed) by comparing the projected image 112 containing the correction image with the projected image 60. For example, the processing unit 12 can determine that the change in image strain has occurred in the case that the shapes of the projected image 112 and the captured image 60 are distorted equal to or more than predetermined threshold values. If the processing unit 12 determines that the change in image strain has occurred (YES in step S304), the processing unit 12 proceeds to an operation in step S305, whereas if the processing unit 12 determines that the change in strain has not occurred (NO in step S304), the processing unit 12 returns to the operation in step S302. As an example of a change in image strain, for example, there are raised a case in which the image forming media 20 are exchanged and a case in which the relative position between the image forming medium 20 and the projector 10 is changed while the projected image 112 is being projected.

In step S305, the processing unit 12 detects coordinates of the correction image in the captured image 60 so as to obtain a degree of strain in the image forming medium 20. The processing unit 12 generates image correction information 111 from the information on the degree of strain.

Then, in step S306, the processing unit 12 can execute an image correction operation on the projected image 112 for forming a solid image (for enjoyment) (the image data of the contents) based on the image correction information 111. Thereafter, the processing unit 12 emits the projected image 112 which is corrected for strain based on the image correction information 111 from a projection unit 13 as projected light P1. In this way, the projector 10 can project the projected image 2a (the corrected projected image 112 (a second projected image)), which is corrected based on the information relating to the captured image 60 (for example, image correction information 841 including difference information (a degree of strain) between coordinates on a display device and coordinates on the captured image 60) of the formed projected image 2a (the projected image 112 before correction which includes the correction image (a first projected image)), by the projected light P1. As a result, the projector 10 can project a spatial projected image 4a in an aerial space so that the spatial projected image 4a can be visualized as intended by the viewer 50.

The spatial projection apparatus 100 of Embodiment 2 can correct the projected image 2a based on the correction image included in the projected image 112 such as the contents or the like. As a result, an initial operation for calculating image correction information 111 can be omitted, whereby a spatial projection can be enabled which provides a high visual sense effect with the simple configuration.

Thus, as has been described heretofore, in the spatial projection apparatus 100 of each of Embodiment 1 and Embodiment 2, the projected image 2a which is projected as the spatial projected image 4a is formed by the projector 10. As a result, the projected image 2a can be displayed whose luminance is higher than in a case in which a display image or a real thing is used as a projection target, whereby the spatial projected image 4a can also be displayed highly brightly. In addition, the projected image 2a projected by the projector 10 can be enlarged in size by enlarging the shape of the image forming medium 20, 20A and providing an appropriate spacing distance between the projector 10 and the image forming medium 20, 20A, whereby the spatial projected image 4a can easily be enlarged in size. As a result, with the spatial projection apparatus 100, a large spatial projected image 4a can be projected without changing the overall configuration thereof largely. Further, the display form of the spatial projected image 4a can easily be changed by changing the characteristic of the image forming medium 20 by driving the rotational wheel 61. In this way, the space projection can be enabled which provides a high visual sense effect with the simple configuration by employing the spatial projection method using the spatial projection apparatus 100 (the spatial projection system 1).

The light guide optical system 30 described in Embodiment 1 and Embodiment 2 that have been described heretofore may adopt a configuration which differs from the configuration in which the light guide optical system 30 includes the beam splitter 31 and the retro-reflection member 32. For example, a spatial projection apparatus 100A of a spatial projection system 1A shown in FIG. 7 includes a light guide optical system 30A including a light reflection member 33 in place of the light guide optical system 30 of the spatial projection system 100 of Embodiment 1 and Embodiment 2. The light reflection member 33 is an optical member for refocusing individual point light sources which are focused on an image forming medium 20 (for example, light from an image forming point F1) on an aerial space image forming section 40 which is positioned planar symmetric with the image forming medium 20 with respect to the light reflection member 33.

Although the light reflection member 33 can adopt an arbitrary configuration, as shown in an enlarged view of a portion C, for example, the light reflection member 33 is made up of a first mirror layer 331 including multiple first mirrors 331a and a second mirror layer 332 including multiple second mirrors 332a, the first mirror layer 331 and the second mirror layer 332 being disposed adjacent to each other. The first mirror 331a is disposed in such a manner that a mirror surface thereof is disposed parallel to an XY plane. In addition, the multiple first mirrors 331a are aligned at equal intervals in the Z-direction in such a manner as to be parallel to one another (also refer to a sectional view taken along a line XI-XI). The second mirror 332a is disposed in such a manner that a mirror surface thereof is at right angles to the mirror surface of the first mirror 331a. In addition, the multiple second mirrors 332a are aligned at equal intervals in a direction which is at right angles to the direction in which the first mirrors 331a are aligned in such a manner as to be parallel to one another. The light reflection member 33 is disposed in such a manner that the second mirrors 332a are inclined at an angle of 45 degrees with respect to a disposition surface S of the image forming medium 20 (with respect to a YZ plane and a ZX plane in the example shown in FIG. 7).

Figure 7:
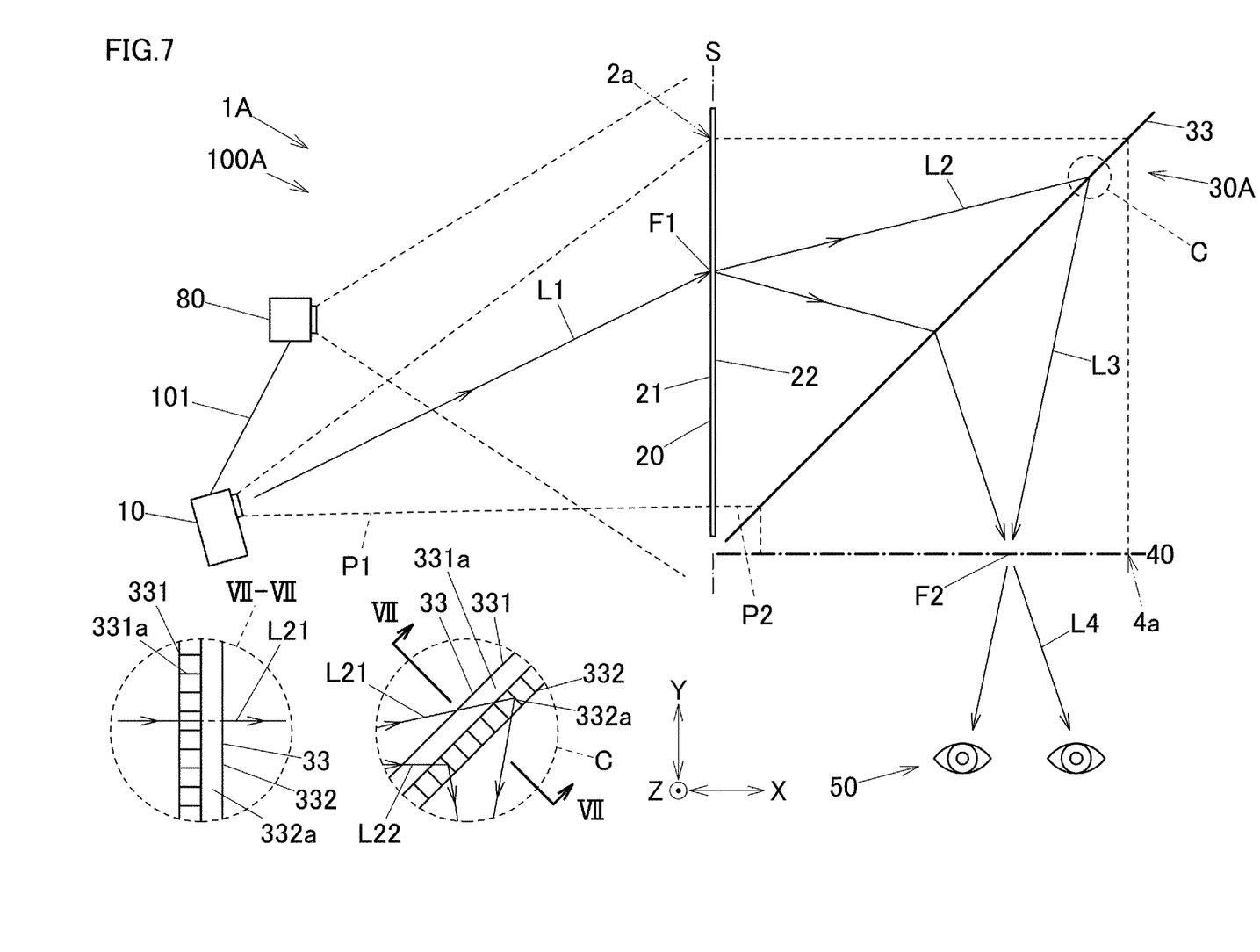
FIG. 7 is a schematic plan view of a spatial projection apparatus having a light guide optical system that can be applied to each of the embodiments of the present invention.

In addition, in the enlarged view of the portion C, optical paths of lights L21, L22, which are emitted from the image forming point F1 and are parallel to the XY plane, are shown when the lights L21, L22 are incident on the light reflection member 33. The lights L21, L22 are not shined onto the mirror surfaces of the first mirrors 331a which are disposed parallel to the XY plane but are incident on the mirror surfaces of the second mirrors 332a. The lights L21, L22 are reflected at reflection angles which are equal to incident angles at which the lights L21, L22 are incident on the second mirrors 332a. Since the light L21 is incident on the second mirror 332a (the light reflection member 33) at a larger incident angle than that of the light L22 at which the light L22 is incident on the second mirror 332a, the light 21 is reflected at a larger reflection angle than that of L22 at which the light L22 is reflected. As a result, a light L2 having a predetermined diffuse angle, which is emitted from the image forming point F1, is reflected at the light reflection member 33 as a light L3 having a convergence angle which is equal to the diffuse angle of the light L2 and is then focused at an image forming point F2 which is positioned planar symmetric with the image forming point F1 with respect to the light reflection member 33. In addition, since a Z-direction component of the light L2 emitted from the image forming point F1 is also reflected at the first mirror 331a, the Z-direction component of the light L2 is also focused at the image forming point F2.

The configuration of the light reflection member 33 is not limited to the configuration shown in the enlarged view of the portion C, and hence, the light reflection member 33 may employ other light reflecting elements which can refocus the individual point light sources focused on the image forming medium 20 at the aerial space image forming section 40 which is positioned planar symmetric with the image forming medium 20 with respect to the light reflection member 33. For example, the light reflection member 33 may be configured as a light reflection member in which multiple minute prisms are provided so as to reflect light incident thereon at a predetermined diffuse angle as light which converges at a convergence angle which is substantially the same as the diffuse angle, so that the light incident on the light reflection member form the point light source is emitted therefrom so as to be focused at the position which is planar symmetric with the image forming point at which the point light source is focused.

Figure 3:
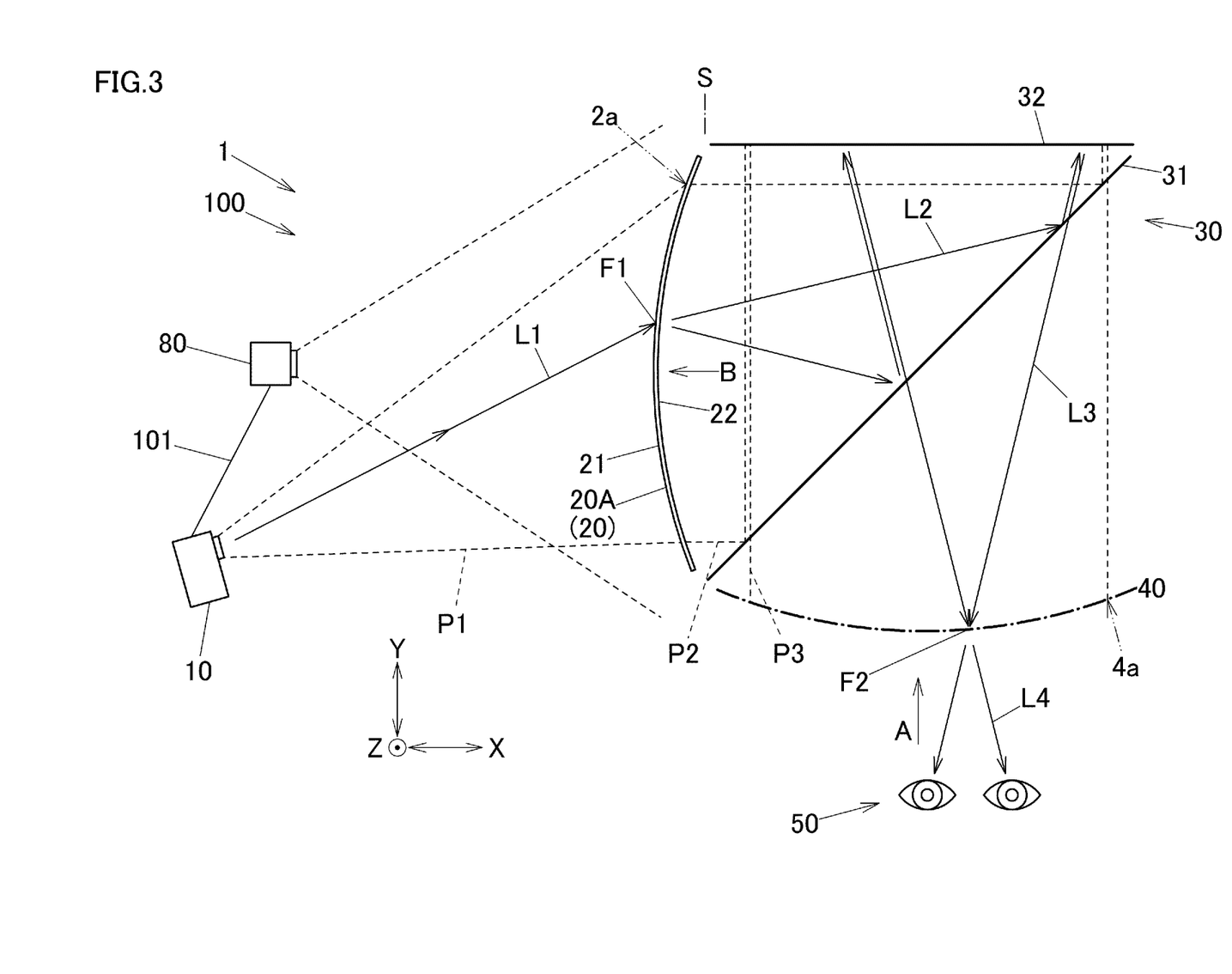
FIG. 3 is a schematic plan view of the spatial projection apparatus in which an arc-shaped image forming medium according to Embodiment 1 of the present invention is disposed.

Thus, as has been described heretofore, with the spatial projection apparatus 100A and the spatial projection system 1A shown in FIG. 7, since the number of components involved in the light guide optical system 30A can be reduced compared with the light guide optical system 30 of Embodiment 1 shown in FIGS. 1 and 3, so that the light guide optical system 30A can be configured simple, the overall size of the spatial projection apparatus 100A (the spatial projection system 1A) can be reduced accordingly. As a result, the space projection can be enabled which provides a high visual sense effect with the simple configuration.

In the spatial projection apparatus 100, 100A described in each of the embodiments, the projector 10, the imaging device 80, the image forming medium 20, the light guide optical system 30, 30A, and the aerial space image forming section 40 may be configured so as to be disposed altogether within one device or may be configured so as to be dispersed into multiple devices. For example, with the spatial projection apparatus 100, 100A, the projector 10 can be configured as a single projector including some of the functions of the image forming medium 20 (20A to 20E), the light guide optical system 30, 30A, and the aerial space image forming section 40.

Figure 8:
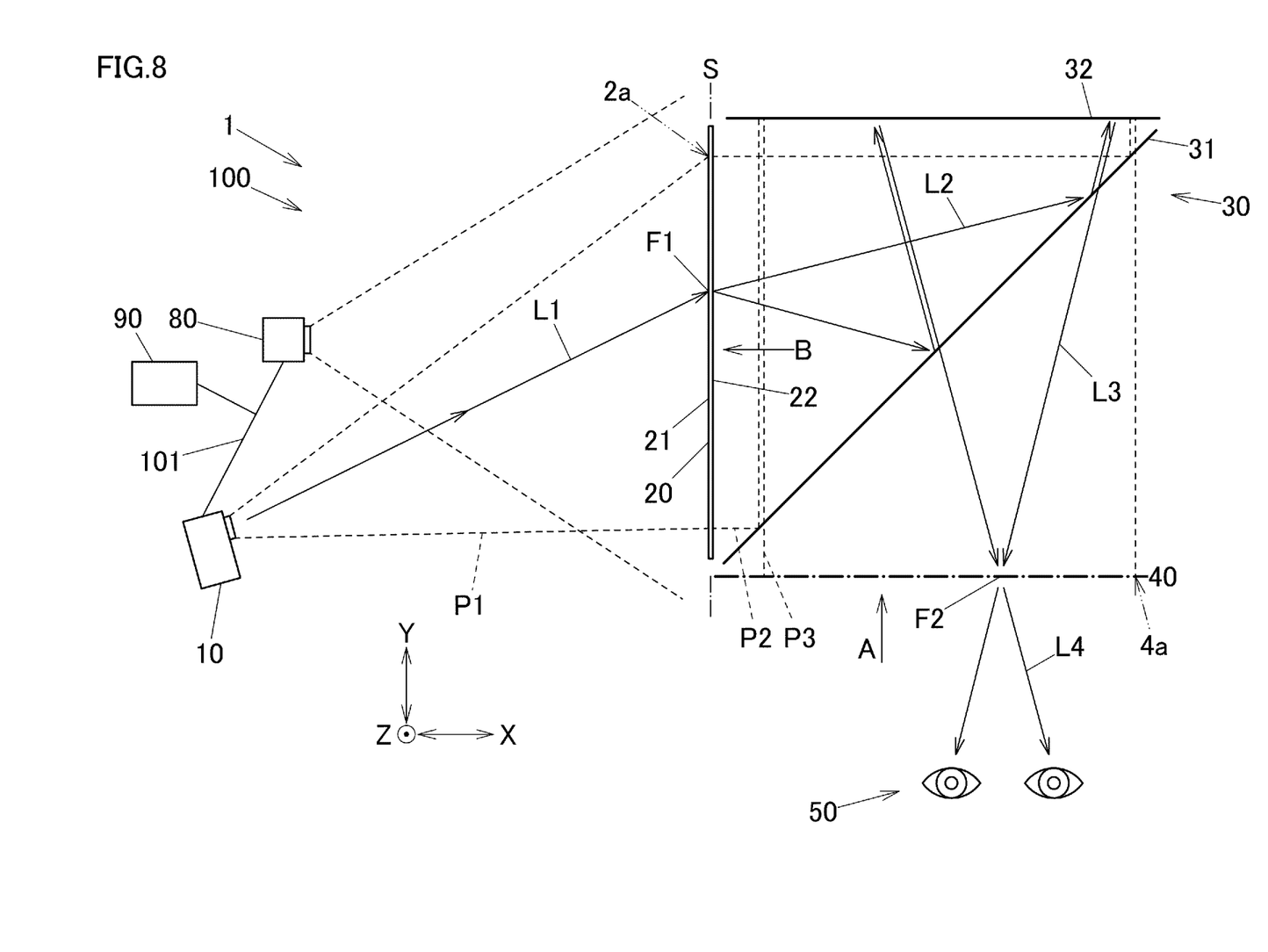
FIG. 8 is a schematic plan view showing another configuration example of a spatial projection apparatus applicable to the embodiments.

In addition, in the present embodiment, the processing unit is described as being provided in the projector 10 as the projection processor, which obtains the information concerning the first projected image which is projected by the projector 10 to be formed on the image forming medium 20 and corrects (as a correction unit) the information concerning the second projected image which is formed on the image forming medium 20 as the projected light which is to be refocused on the aerial space image forming section 40 by the light guide optical system 30 based on the information concerning the first projected image obtained. However, the processing unit may be provided as a separate device from the projector 10. FIG. 8 is a schematic plan view showing another configuration example of a spatial projection apparatus 100. The spatial projection apparatus 100 includes a projection processor 90 in addition to the configuration of the spatial projection apparatus 100 shown in FIG. 1. The projection processor 90 has the correction unit described above, a communication unit (an obtaining unit) configured to obtain information on a captured image 60 or the like, and a storage unit configured to store data on a projected image (the correction image 70, the image correction information 111, and the projected image 112 which are shown in FIG. 2). The projection processor 90 can be made up of a general purpose device such as a personal computer or the like or an exclusive device. The projection processor 90 obtains a captured image 60 or image correction information 841 from an imaging device 80 by way of the communication unit, corrects a projected image 112 using the correction unit, and transmits the projected image 112 so corrected to a projector 10. As a result, the projection processor 90 can control or process the projection from the projector 10 so that the corrected projected image 112 (a second projected image) can be projected from the projector 10. Here, the projection processor 90 may be provided in the spatial projection apparatus 100A shown in FIG. 7.

In addition, the imaging device 80 may image the projected image 2*a* formed on the image forming medium 20, 20A from either the first surface 21 or the second surface 22 of the image forming medium 20, 20A and may image the projected image (the spatial projected image 4*a*) formed on the aerial image forming section 40 from an emerging side (a side facing the viewer 50) of the aerial image forming section 40. The present invention is not limited to the case in which the imaging device 80 is provided separately from the projector 10 inside the spatial projection apparatus 100, 100A. Thus, the imaging device 80 may be provided as a part of the projector 10 or may be configured so as not to be included in the spatial projection apparatus 100, 100A. A communication between the projector 10 and the imaging device 80 can be performed using an arbitrary wired or wireless means.

The spatial projection apparatus 100 may combine the operations shown in FIG. 4 and the operations shown in FIG. 6 together for execution.

The operations (S204 to S206 and S303 to S306) after imaging in FIGS. 4 and 6 may be performed in either of the projector 10 and the imaging device 80 or may be performed by another different device from the projector 10 and the imaging device 80.

The method for obtaining the information concerning the first projected image projected to be formed on the image forming medium 20 by the projector 10 may adopt another method than imaging.

The projector 10 is not limited to the DLP system, and hence, the projector 10 may adopt other systems. A projector employing a liquid crystal panel or of an LCP type may be employed as the projector 10. In the LCP-type projector, the transmittances of light in the blue wavelength range, light in the green wavelength range, and light in the red wavelength range are controlled for each pixel by a liquid crystal filter (a liquid crystal plate), and the light in the blue wavelength range, the light in the green wavelength range, and the light in the red wavelength range from individual pixels which have been transmitted through the liquid crystal filter are combined together so as to be emitted as projected light.

In addition, a projector employing a liquid crystal on silicon system or of an LCoS type may be employed as the projector 10. In the LCoS-type projector, a display device having a liquid crystal filter (a liquid crystal layer) which can change the transmittance of light for each pixel (and also can cut off light) is disposed on a reflection layer. As a result, the projector reflects light source light shined on the display device while controlling the amount of light for each pixel so as to form image forming light. The image forming light so formed is then emitted to the outside as projected light, whereby a projected image 2*a* can be projected on the image forming medium 20, 20A.

In the examples in which the LCP-type projector and the LCoS-type projector are used as the projector 10, the individual blue, green, and red lights (the light in the blue wavelength range, the light in the green wavelength range, and the light in the red wavelength range) are polarized light having a predetermined polarizing direction. As a result, for example, in Embodiment 1, a polarizing mirror, which is configured to reflect one of an S-polarized light and a P-polarized light and to transmit the other thereof may be disposed as the beam splitter 31, and a quarter-wave plate may be disposed between the beam splitter 33 and the retro-reflection member 32. As a result, the beam splitter 33 reflects, in the lights emitted from the image forming medium 20, 20A a light in a first polarizing direction, which is one of the S-polarized light and the P-polarized light, towards the retro-reflection member 32, and the light so reflected is passed through the quarter-wave plate to be converted into a circular polarized light, whereafter the circular polarized light is reflected by the retro-reflection member 32. The circular polarized light, which is reflected by the retro-reflection member 32, passes through the quarter-wave plate again to thereby be converted into a light in a second polarizing direction which is at right angles to the first polarizing direction, and the light in the second polarizing direction then passes through the beam splitter 31. In this way, in the case that the polarizing mirror is used as the beam splitter 31, since most of the light which is reflected once by the beam splitter can be passed through the beam splitter after having been reflected by the retro-reflection member 32, the utilization efficiency of light can be increased compared with the case in which the half mirror is used.

A projector of a laser scanning type may be employed as the projector 10. In the laser scanning-type projector, a laser beam, which is a color mixture of a desired color produced by combining light in the blue wavelength range, light in the green wavelength range, and light in the red wavelength range, is shined onto the display device, and the display device reflects the laser beam so shined thereon while controlling the reflection angle in a time sharing fashion and shines the laser beam on the image forming medium 20, 20A, which constitutes a projection target object. As this occurs, the display device shines the laser beam in such a manner as to scan the image forming medium 20, 20A two-dimensionally in a vertical direction and a horizontal direction, whereby the display device can project a projected image 2*a* on the image forming medium 20, 20A. With the laser scanning-type projector, since the projection lens for collecting light emitted from the display device can be omitted, the overall size of the projector can be made small. In addition, with this projector, since an image can be formed by the laser beam, even in the case that a three-dimensional image forming medium whose irregularity is great is used, an intended clear projected image 2*a* can be projected.

While the configuration is described in which the image forming medium 20, 20A adopts the plate-like flexible film, smoke or fluid such as water or the like may be employed as the image forming medium 20. In the case that a fluid is employed for the image forming medium 20, 20A, a light transmitting container in which the fluid is confined may be disposed.

In addition, the image forming medium 20, 20A may be colored. As a result, the color of the spatial projected image 4*a* can be changed, or the perceived color thereof can be adjusted arbitrarily. In the case that the fluid is employed as the image forming medium 20, 20A, the fluid may be colored. The coloring of the image forming medium 20 may be changed over time in time series. As a result, various dramatic effects can be expressed.

The light guide optical system 30, 30A may be configured so that light emitted from the image forming medium 20, 20A is refocused on the aerial space image forming section 40 using a Fresnel lens.

In the embodiments that have been described heretofore, the image forming medium 20, 20A is described as the light transmitting image forming medium in which the projected light P1, which is projected onto the image forming medium 20, 20A, is incident from the first surface 21, emerges from the second surface 22, and is guided towards the light guide optical system 30, 30A as the spatial projected light P2. However, the image forming medium 20, 20A may adopt a reflection-type image forming medium (a projection target medium such as a projector screen, a wall surface, or the like) in which the projected light P1 is incident on and emerges from the same surface.

The projected image 2a formed on the image forming medium 20, 20A by the projected light P1 is not limited to the mage formed by the projected light emitted from the projector 10, and hence, the projected image 2a may be an optical image formed by arbitrary light source light emitted from another light source device as projected light, illumination light, LED light or laser light. Alternatively, the projected image 2a may be formed by visible light by using an arbitrary light source or may be formed by non-visible light (for example, for use as a digital watermark or the like).

Thus, as has been described heretofore, the image forming medium changing device of the spatial projection system 1, 1A and the spatial projection apparatus 100, 100A described in each of the embodiments includes the projector 10, and the image forming medium 20, 20A on which the projected light, which is focused on the aerial space image forming section 40 by the light guide optical system 30, 30A, is focused. In addition, the projector 10 projects the second projected image (the corrected projected image 112 which is projected as the projected image 2a and the spatial projected image 4a) which is corrected based on the information concerning the captured image 60 of the formed first projected image (the projected image 112 including the correction image 70 of Embodiment 1 or the correction image of Embodiment 2 which is projected as the projected image 2a and the spatial projected image 4a) by the projected image P1. Further, with the spatial projection system 1, 1A and the projection processor which controls or processes the projection operations of the spatial projection apparatus 100, 100A, the processing unit obtains the information concerning the first projected image (2a) projected to be formed on the image forming medium 20 by the projector 10 (as the obtaining unit) and corrects the information concerning the second projected image (2a) which is formed on the image forming medium 20 as the projected light which is to be refocused on the aerial space image forming section 40 by the light guide optical system 30 based on the information concerning the first projected image (2a) obtained. As a result, even in the case that the projected light P1 is shined obliquely onto the image forming medium 20, 20A or in the case that the image forming medium 20, 20A is formed on an arbitrary three-dimensional surface, the intended spatial projected image 4a as viewed by the viewer 50 can be displayed in the aerial space by correcting the strain in the projected image 2a formed on the image forming medium 20, 20A. As a result, the spatial projection can be enabled which provides a high visual sense effect with no defective image being produced.

In addition, with the projection processor in which the obtaining unit described above obtains the captured image 60 of the first projected image (2a) formed on the image forming medium 20 as the information concerning the first projected image (2a), the relevant information for use for the first projected image (2a) can easily be obtained.

With the spatial projection apparatus 100, 100A in which the captured image 60 is obtained by imaging the image forming medium 20 from the side thereof which faces the projector 10, the exposure of the imaging device 80 to the viewer 50 is reduced, and the degree of strain of the projected image 2a can be detected on the side facing the projector 10.

With the spatial projection apparatus 100, 100A in which the captured image 60 is obtained by projecting the correction image 70 with which the degree of strain in the image forming medium 20, 20A is obtained before the projection of the projected image 112 which is an image for forming a solid image (for enjoyment), even in the case that the shape of the image forming medium 20, 20A or the positional relationship between the projector 10 and the image forming medium 20, 20A is changed, the spatial projected image 4a can be projected in the intended shape or the like.

With the spatial projection apparatus 100, 100A in which the captured image 60 is obtained during projection of the projected image 112 which is an image for forming a solid image (for enjoyment) including the correction image whose position can be detected, even in the case that the shape of the image forming medium 20, 20A or the positional relationship between the projector 10 and the image forming medium 20, 20A is changed, the spatial projected image 4a can be projected in the intended shape or the like.

With the spatial projection apparatus 100, 100A in which the strain correction is executed as correction of the projected image 112, the strain is corrected which would result from the projecting direction of the projected light P1 and the shape of the image forming medium 20, 20A which constitutes the projection target plane, whereby the spatial projected image with a high sense effect can be projected.

With the spatial projection apparatus 100, 100A having the light guide optical system 30, 30A and in which the light guide optical system 30, 30A guides the light focused on the image forming medium 20, 20A so as to be refocused on the aerial space image forming section 40, the overall configuration can be integrated together into a single small body.

The image forming media 20, 20A is the light transmitting member in which the projected light P1 is shined onto the first surface 21, and the light is diffuse emitted towards the light guide optical system 30, 30A from the second surface 22 which is the opposite surface to the first surface 21. As a result, the configuration including the image forming media 20, 20A and the light guide optical system 30, 30A can be made small in size.

The light guide optical system 30, 30A is described as including the beam splitter 31 and the retro-reflection member 32, and the beam splitter 31 is described as reflecting the light emitted from the image forming medium 20, 20A towards the retro-reflection member 32 and transmitting the light reflected on the retro-reflection member 32 therethrough towards the aerial space image forming section 40. As a result, the light emitted from each of the point light sources on the projected image 2a and diverging at a wide angle can be formed simply.

In addition, the spatial projection method is described as including obtaining the information concerning the first projected image which is projected to be formed on the image forming medium 20, 20A by the projector 10 (the projected image 112 including the correction image 70 of Embodiment 1 or the correction image of Embodiment 2 which is projected as the projected image 2a and the spatial projected image 4a), correcting the information concerning the second projected image which is formed on the image forming medium 20, 20A as the projected light which is to be refocused on the aerial space image forming section 40 by the light guide optical system 30 (the corrected projected image 112 which is projected as the projected image 2a and the spatial projected image 4a) based on the information concerning the captured first projected image, and projecting the second projected image using the projector 10. As a result, even in the case that the projected light P1 is shined obliquely onto the image forming medium 20, 20A or in the case that the image forming medium 20, 20A is formed on an arbitrary three-dimensional surface, the intended spatial projected image 4a as viewed by the viewer 50 can be displayed in the aerial space by correcting the strain in the projected image 2a formed on the image forming medium 20, 20A. As a result, the spatial projection can be enabled which provides a high visual sense effect with no defective image being produced.

The embodiments that have been described heretofore are presented as examples, and hence, there is no intention to limit the scope of the present invention by those embodiments. These novel embodiments can be carried out in other various forms, and various omissions, replacements, and modifications can be made thereto without departing from the spirit and scope the invention. These embodiments and their variations are included in the spirit and scope of the invention and are also included in scopes of inventions set forth under claims and their equivalents.

What is claimed is:

1. A projection processor, comprising:
   a processing unit,
   wherein the processing unit
   obtains information concerning a first projected image which is projected by a projector to be formed on an image forming medium, and
   corrects information concerning a second projected image which is formed on the image forming medium as projected light, which is to be refocused on an aerial space image forming section by a light guide optical system, based on the information concerning the first projected image obtained.

2. The projection processor according to claim 1, wherein the processing unit obtains a captured image of the first projected image formed on the image forming medium as the information concerning the first projected image.

3. The projection processor according to claim 2, wherein the captured image is obtained by imaging the image forming medium from a side thereof which faces the projector.

4. The projection processor according to claim 3, wherein the captured image is obtained by projecting a correction image for obtaining a degree of strain in the image forming medium before an image is projected for forming a solid image.

5. The projection processor according to claim 3, wherein the captured image is obtained during projection of an image for forming a solid image which includes a correction image whose position can be detected.

6. The projection processor according to claim 1, wherein the correction is a strain correction.

7. The projection processor according to claim 1, comprising:
   the light guide optical system, wherein
   the light guide optical system guides light focused on the image forming medium to cause the light to be refocused on the aerial space image forming section.

8. The projection processor according to claim 1, comprising:
   the image forming medium,
   wherein the image forming medium is a light transmitting member in which the projected light is shined onto a first surface and the light is diffuse emitted towards the light guide optical system from a second surface which is an opposite surface to the first surface.

9. The projection processor according to claim 1,
   wherein the light guide optical system comprises a beam splitter and a retro-reflection member, and
   wherein the beam splitter reflects light emitted from the image forming medium towards the retro-reflection member and transmits light reflected by the retro-reflection member towards the aerial space image forming section.

10. A spatial projection apparatus, comprising:
    a projector comprising a processing unit,
    wherein the processing unit obtains information concerning a first projected image which is projected by the projector to be formed on an image forming medium, and
    corrects information concerning a second projected image which is formed on the image forming medium as projected light, which is to be refocused on an aerial space image forming section by a light guide optical system, based on the information concerning the first projected image obtained.

11. A spatial projection system, comprising:
    a projector having a processing unit,
    wherein the processing unit obtains information concerning a first projected image which is projected by the projector to be formed on an image forming medium, and
    corrects information concerning a second projected image which is formed on the image forming medium as projected light, which is to be refocused on an aerial space image forming section by a light guide optical system, based on the information concerning the first projected image obtained.

12. A spatial projection method, comprising:
    obtaining information concerning a first projected image which is projected by a projector having a processing unit to be formed on an image forming medium;
    correcting information concerning a second projected image which is formed on the image forming medium as projected light, which is to be refocused on an aerial space image forming section by a light guide optical system, based on the information concerning the first projected image obtained; and
    causing the projector to project the second projected image.

13. The spatial projection method according to claim 12, wherein a captured image of the first projected image formed on the image forming medium is obtained by the processing unit as the information concerning the first projected image.

14. The spatial projection method according to claim 13, wherein the captured image is obtained by imaging the image forming medium from a side thereof which faces the projector.

15. The spatial projection method according to claim 14, wherein the captured image is obtained by projecting a correction image for obtaining a degree of strain in the image forming medium before an image is projected for forming a solid image.

16. The spatial projection method according to claim 14, wherein the captured image is obtained during projection of an image for forming a solid image which includes a correction image whose position can be detected.

17. The spatial projection method according to claim 12, wherein the correction is a strain correction.

* * * * *